A. KINGSBURY.
BEARING.
APPLICATION FILED FEB. 26, 1916.

1,361,073.

Patented Dec. 7, 1920.
2 SHEETS—SHEET 1.

INVENTOR
Albert Kingsbury
BY
ATTORNEY

A. KINGSBURY.
BEARING.
APPLICATION FILED FEB. 26, 1916.
1,361,073.
Patented Dec. 7, 1920.
2 SHEETS—SHEET 2.
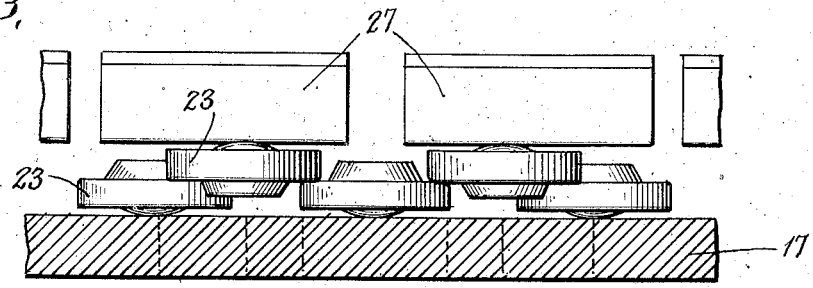
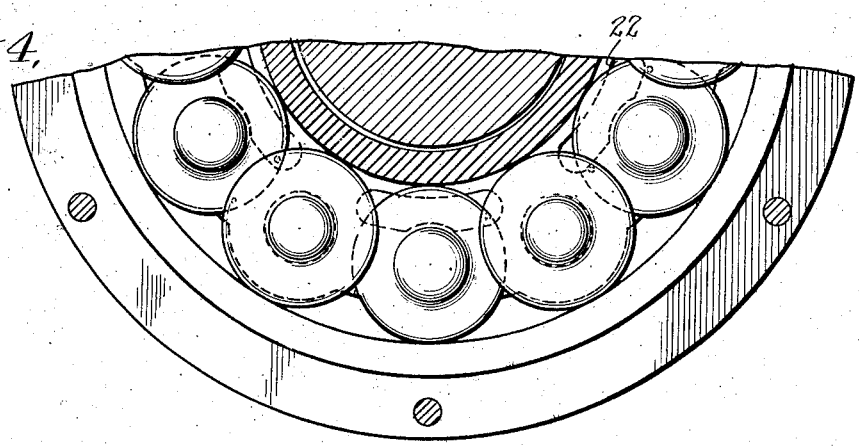
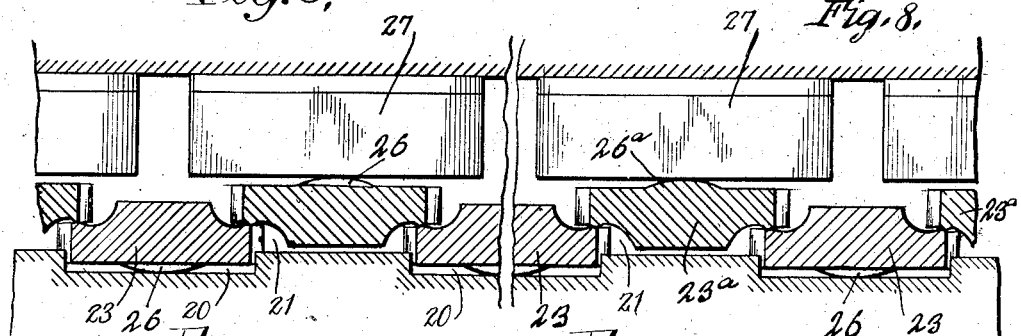
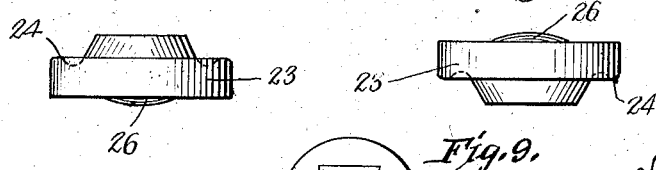
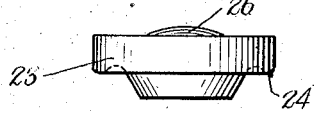
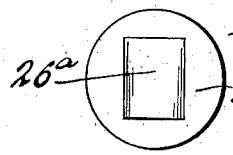
INVENTOR
Albert Kingsbury
BY
ATTORNEY

UNITED STATES PATENT OFFICE.

ALBERT KINGSBURY, OF PITTSBURGH, PENNSYLVANIA.

BEARING.

1,361,073.

Specification of Letters Patent.  Patented Dec. 7, 1920.

Application filed February 26, 1916. Serial No. 80,569.

*To all whom it may concern:*

Be it known that I, ALBERT KINGSBURY, a citizen of the United States, and a resident of Pittsburgh, Allegheny county, and State of Pennsylvania, have invented certain new and useful Improvements in Bearings, of which the following is a specification, reference being had to the accompanying drawings, forming a part thereof.

My invention relates generically to bearings of various types which comprise a series of tiltably mounted bearing segments or shoes; but it has special reference to thrust bearings for vertical, horizontal or inclined shafts, particularly such as are designed to carry heavy loads, or operate under usually severe conditions.

One object of my invention is to provide a simple and durable bearing of the character above indicated which comprises a relatively small number of different parts and which provides for the automatic equalization or equitable distribution of the pressure upon the several bearing segments or shoes.

Another object of my invention is to provide a subdivided but substantially continuous equalizing structure which is both circumferentially and radially flexible.

Another object of my invention is to provide an equalizing structure made up of rocking or tiltable inter-related elements whereby said structure is circumferentially flexible.

Another object of my invention is to provide an equalizing structure which is made up of a conjoined series of interengaged and mutually tiltable elements which can yield both longitudinally and transversely and thereby permit the structure, as a whole, to flex either circumferentially or radially with respect to the axis of the bearing.

Yet another object of my invention is to provide improved mounting means for the bearing segments or shoes whereby radial tilting thereof is facilitated.

Still another object of my invention is to provide a mounting for the bearing segments or shoes which occupies but a relatively small space in an axial direction and which is radially flexible to provide for local tilting of the bearing segments in radial planes to compensate for irregularity or distortion of the bearing surfaces.

Yet another object of my invention is to provide a flexible equalizing structure the component parts of which offer but a minimum of opposition to the movements which effect automatic distribution of the bearing pressure.

Another object of my invention is to provide for the ready adjustment of the plane of bearing engagement without interfering with the aforesaid equalization.

Still another object of my invention is to provide for the ready removal and replacement of one or more of the bearing segments or shoes or of one or more of the members of the equalizing structure.

Other objects and advantages of my invention will be set forth hereinafter, and in order that my invention may be thoroughly understood I will now proceed to describe the same in the following specification and then point out the novel features thereof in appended claims. The invention, however, is capable of receiving a variety of mechanical expressions, two of which are shown on the accompanying drawings, and it is to be expressly understood that the drawings are for purposes of illustration only and are not to be construed as a definition of the limits of the invention, reference being had to the appended claims for that purpose.

Referring to the drawings:

Figure 1 is a sectional elevation of a bearing arranged and constructed in accordance with my invention.

A plan view of the same bearing with certain of the parts broken away, to show the shoes and the equalizing members, is shown in Fig. 2.

Fig. 3 is a partial elevation showing the equalizing members in detail.

Fig. 4 is a partial plan view of the equalizing members and showing particularly the form of the annular base in which the equalizing members are mounted.

Fig. 5 is a sectional elevation drawn to a larger scale showing a development into a single plane of a plurality of shoes and the coöperating members of the equalizing support.

Figure 1:
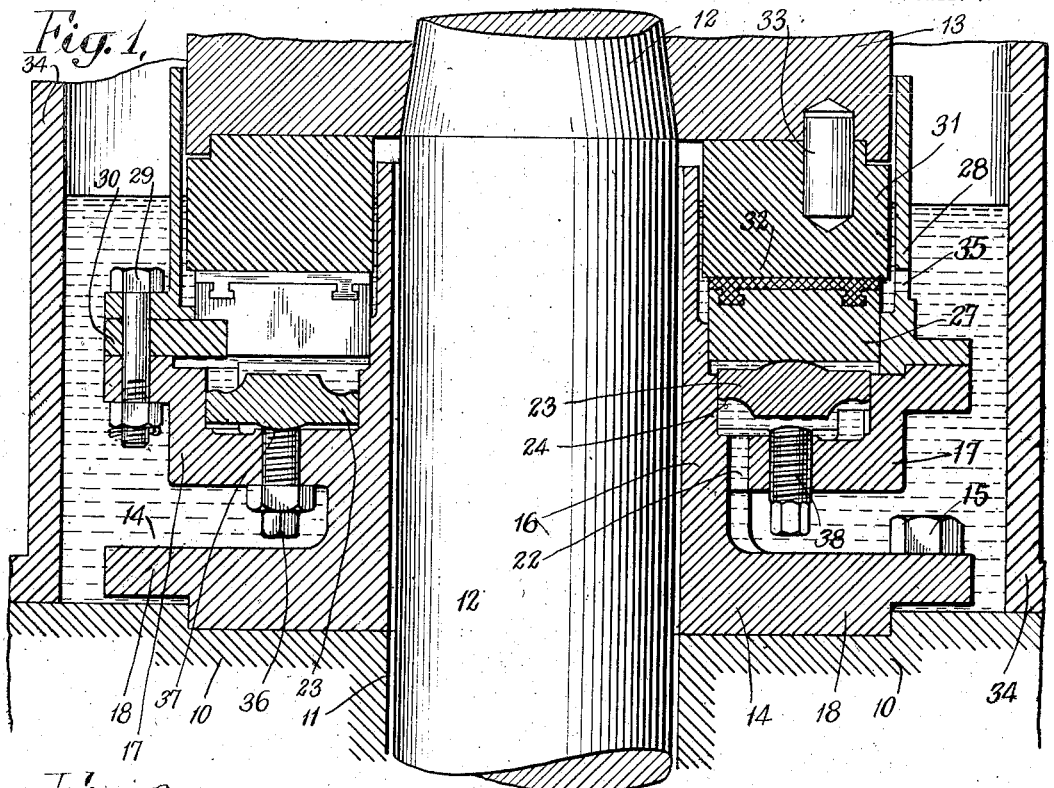
Figure 2:
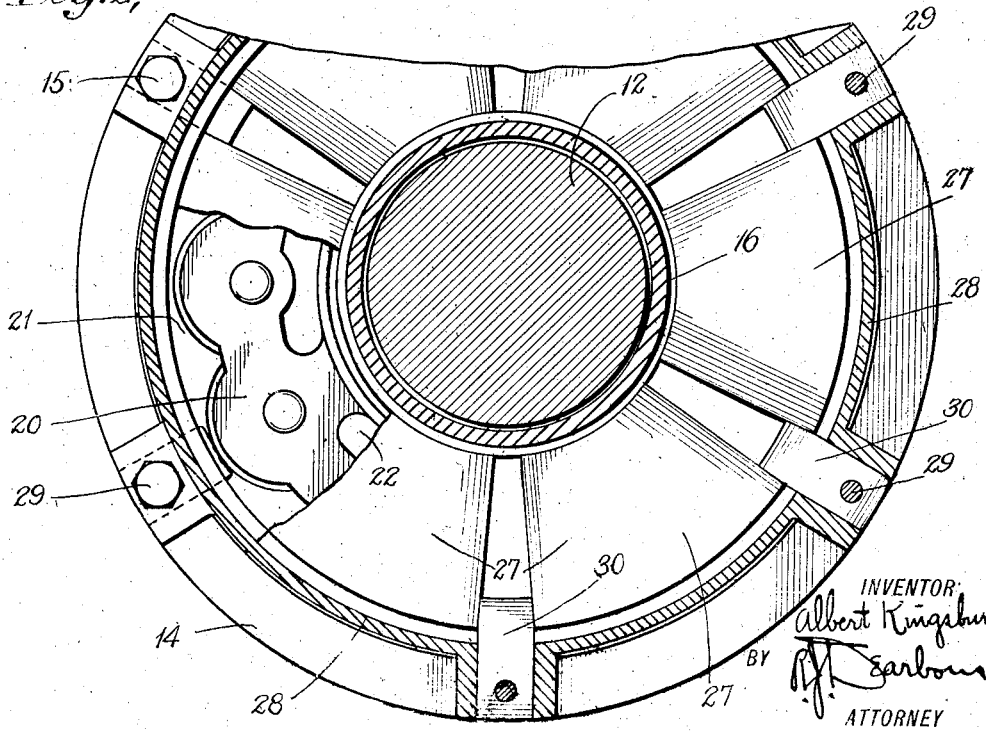

The equalizing members are shown in detail in Figs. 6 and 7.

Another embodiment of the present invention is shown in Fig. 8, which corresponds to Fig. 5, one of the upper members being shown in plan in Fig. 9.

In the structure illustrated, 10 designates a stationary foundation having an opening 11 through which a vertical shaft 12 extends.

A thrust block 13 is attached to the shaft near its upper end and overhangs an annular base 14 and this base is secured to the foundation 10 by bolts 15 or other suitable means. The base 14 in the form shown is composed of a sleeve 16 having two outwardly extending annular projections 17 and 18, through the latter of which said bolts 15 extend. The top surface of the upper projection 17 is annularly recessed to provide a plurality of cylindrically curved sockets which are uniformly spaced about the axis of the shaft as a center and are so close together as to break into each other. Said sockets may be alternately of greater and less depth, the deeper ones being designated 20 and the shallower ones 21.

As clearly shown in Figs. 1 and 4, there are slots or openings 22 through the annular projection 17 to provide for the circulation of lubricant as hereinafter explained.

Disposed in the annular recess of the projection 17 and held in position by the sockets 20 and 21 are a plurality of similar equalizing members or blocks 23 arranged in two sets. Each block has a bead or flange 24 and a spherically curved projection or button 26.

The blocks of one set are mounted in the sockets 20 upon their spherically curved projections 26 which constitute pivotal supports. The blocks of the other set are loosely supported in the sockets 21, each block being inverted and mounted on a pair of the lower blocks with their beads 24 in engagement, as clearly shown in Figs. 3, 4 and 5.

The blocks 23 coöperate so as to form with one another what may be termed lapped joints and constitute a flexible equalizing ring structure which is relatively thin and occupies a very small space in an axial direction. Therefore the axial dimension of the entire bearing is materially reduced by utilizing my invention and thus a very important saving is accomplished. This is particularly valuable as applied to a horizontal or inclined shaft thrust bearing as used for example with the propeller shaft of a ship.

The spherically curved buttons 26 of the upper blocks or plates 23 face upwardly and constitute pivotal supports for a plurality of bearing members or shoes 27.

The blocks fit loosely into the sockets of the base so that a considerable freedom of movement is permitted for each block. At the same time their relative positions are maintained by the base sockets. The shoes are held loosely in position between the sleeve portion 16 of the base and a removable guard ring 28 which may be made in sections and secured by bolts 29 or other suitable means to the base 14.

The bolts 29 may serve also as a means for holding in position keys 30 which extend radially inward between the shoes 27 and thereby prevent the rotation of the shoes.

Seated upon the thrust block 13 is a collar 31 which rotates with the thrust block and has a bearing surface 32 with which the bearing segments or shoes 27 coöperate. One or more dowel pins 33, or other suitable means, is provided for insuring the rotation of the collar.

Mounted on the foundation 10 and surrounding the bearing is a cylindrical member or flange 34 which, together with the base 14 and the sleeve 16 thereof, forms an annular reservoir in which lubricating fluid is contained. The ring 28 is perforated as indicated at 35 so that it does not interfere with the circulation of oil from the bearing to the reservoir, the oil circulating from the reservoir inwardly between the flanges 17 and 18 of the base, upwardly through the passages 22, between and around the blocks 23, around the shoes 27 and outwardly between the shoes, the oil for lubricating the bearing being wedged between the bearing segments or shoes and the bearing surface 32 of the thrust collar 31 in accordance with the principles of my bearings.

I prefer to provide a plurality of screws 36 corresponding in number to the lower blocks or plates 23, each of said screws having a flat end surface 37 which forms a base for one of said lower blocks, and a plurality of screws 38 corresponding in number to the upper blocks or plates 23, each of said screws being directly under one of said upper blocks.

The screws 36 extend through tapped holes in the annular base projection 17 and constitute means for adjusting the level of the lower blocks 23 to determine the location of the plane of the bearing surfaces. The screws 38, however, are not intended to be in engagement with the upper blocks 23 except when it is desired to raise one or more of said blocks for the purpose of removing some one or more of the equalizing blocks or shoes.

In operation the blocks 23 are free to rock sufficiently to perform their function of equalizing or equitably distributing the load pressure upon the several bearing segments or shoes. In the form shown, the blocks are of such form and size that there are four places of contact between one of the upper blocks and the two lower blocks on which it rests. These places or points of contact are so located that they form a trapezoid within which lies the point of pivotal support for the corresponding bearing segment or shoe.

Special attention is directed to the fact that one or all of the lower blocks may be raised or lowered to adjust the position of the shaft and its attached parts by merely turning one or more of the screws 36.

As already indicated, the screws 38 have, under normal condition, no contact with the blocks, but they may be employed to take the load from the lower blocks when it is desired to remove one or more shoes for inspection or repair. For example, the screws 38 under all but one of the shoes may be turned so as to take the load from the remaining shoe, which may then be removed as soon as the sleeve 28, which is preferably made in sections, is out of the way. The sleeve 28, however, may be made in one piece if desired provided it is arranged for endwise removal.

It will be observed that the annularly arranged system of overlapping and interbearing blocks or members 23 constitute in effect a substantially continuous flexible equalizing ring which cannot only bend or flex longitudinally to provide for an equal pressure engagement between the bearing segments or shoes 27 and the collar 31, but can also flex or twist transversely or radially—on the pivotal supports 26 for the lower blocks 23— and thereby permit the bearing segments or shoes to tilt in radial planes independently of any movement between the said segments or shoes and the upper row of blocks 23. The upper row of supports 26 may therefore be made either of the form shown in Figs. 1, 2, 3, 4 and 7—where the upper and lower blocks are, for the purpose of simplicity and ease of manufacture, made exactly alike—or may be made in the form of narrow transverse ribs—as indicated at 26ª in Figs. 8 and 9,—which will afford a broader contact engagement between the equalizer blocks or plates and the bearing segments or shoes. In such case the bearing segments or shoes are still tiltingly mounted in the sense just described.

In either case, the bearing segments or shoes may tilt circumferentially of the bearing to form wedge-shaped oil films in accordance with the principles of my bearings. In all of the embodiments of my invention the successive bearing segments or shoes are operatively conjoined, to form an interrelated series, by the ring of flexibly interrelated or conjoined members or blocks 23; and, owing to the radial flexibility of said ring and the annularly arranged pivotal supporting means composed of the projections 26, local tilting of the bearing segments in radial planes is permitted, as well as circumferential tilting of said segments, to accommodate irregularity or distortion of the bearing members in accordance with the principles of my bearings; furthermore, in the arrangement of Figs. 1 to 7, the bearing segments may also tilt radially with respect to said flexible ring.

It will also be observed that the flexible equalizing ring opposes but a minimum of opposition to the movement of its parts to perform its equalizing function, because each of said parts may rock or tilt freely on the pivotal support provided therefor.

While the invention has been shown as embodied in a bearing for a vertical shaft, it is to be expressly understood that the invention is not limited thereto. Various changes may also be made in the construction and form of the projections 26 to provide for circumferential tilting or both circumferential and radial tilting, as well as in the manner of flexibly conjoining the ends of the blocks 23 so as to obtain a substantially continuous flexible equalizer support, without departing from the spirit of my invention. Various embodiments of my invention will suggest themselves to those skilled in the art, as the same is capable of receiving a variety of mechanical expressions, while features thereof may be used without other features thereof. Reference is therefore to be had to the claims hereto appended for a definition of the limits of my invention.

What I claim is:

1. A bearing comprising a pivotally mounted and radially or transversely flexible equalizing ring and bearing members tiltably supported by the said ring.

2. A bearing comprising a base, a laterally flexible equalizing ring pivotally mounted thereon, and bearing shoes tiltably supported by said ring.

3. A bearing comprising a base, a laterally flexible ring member pivotally mounted thereon, and bearing shoes concentrically arranged on the opposite side of the ring and tiltingly supported thereby.

4. A bearing comprising a base, a series of annularly arranged blocks pivotally mounted thereon, a second series of blocks bridging the ends of the first series, the two series constituting a substantially continuous laterally and circumferentially flexible equalizing member, and bearing shoes tiltably supported by the said member.

5. In a bearing the combination of an equalizer comprising tiltably mounted members and bridging members each mounted upon and bridging the space between a pair of tiltable members, and bearing means mounted on the bridging members.

6. A bearing comprising a base having an annular recess formed to provide a plurality of sockets, equalizing members tiltably mounted in alternate sockets, members in the remaining sockets bridging and conjoining each pair of adjacent equalizing members, and bearing members on said bridging members.

7. A bearing comprising a base having an annular recess formed to provide a plurality of sockets, equalizing members tiltably mounted in alternate sockets, members in the remaining sockets bridging and conjoining each pair of adjacent equalizing members, and bearing members tiltably mounted on said bridging members.

8. A bearing comprising a base, equalizing members tiltably mounted on said base, members bridging and conjoining each pair of adjacent equalizing members, bearing members tiltably mounted on said bridging members, and adjustable members for determining the position of each of said equalizing members.

9. A bearing comprising a base, equalizing members tiltably mounted on said base, members bridging and conjoining each pair of adjacent equalizing members, bearing members tiltably mounted on said bridging members, adjustable members for determining the position of each of said equalizing members, and means for lifting the bridging members off of the equalizing members.

10. A bearing comprising a base, equalizing members tiltably mounted thereon, members bridging and conjoining each pair of adjacent equalizing members, bearing members tiltably mounted on said bridging members, and means for lifting said bridging members off of the equalizing members.

11. A bearing comprising a pivotally-mounted circumferentially flexible equalizing ring, and bearing members tiltably mounted on said ring.

12. In a bearing the combination of a base, a series of bearing segments, and a substantially continuous flexible equalizing structure of interrelated and conjoined members, interposed between the base and the bearing segments and adapted to yield both circumferentially and radially.

13. A bearing comprising in combination a base, a plurality of bearing shoes, and an interposed sub-divided flexible ring member adapted to yield or flex both longitudinally and transversely of its length or circumference.

14. A bearing comprising in combination a bearing member, an annularly arranged plurality of bearing segments in engagement therewith, a support for the bearing segments, and a flexible equalizing structure comprising inter-related tiltable members interposed between said support and said segments and adapted to establish and maintain a substantially uniform pressure engagement between the surfaces of the bearing member and the bearing segments substantially as described.

15. In a bearing the combination of relatively fixed and rotatable members, a plurality of annularly arranged shoes mounted on one of said members and a flexible, substantially continuous sub-divided equalizing structure interposed between the shoes and the latter member and arranged to support the shoes in substantially uniform bearing engagement with the other member.

16. In a bearing the combination of a series of bearing shoes and a shoe supporting member comprising a substantially continuous equalizing structure capable of flexing both longitudinally or circumferentially and transversely or radially and permitting the supported shoes to move endwise of the bearing and also tilt radially with respect thereto.

17. In a thrust bearing the combination of an annularly arranged set of bearing shoes and a pivotally-mounted transversely flexible ring support which carries the shoes and permits them to tilt radially by reason of the lateral or transverse flexibility of the ring.

18. A thrust bearing comprising relatively rotatable annular bearing members in contact with one another, and a laterally flexible ring support for one of said members, the said ring being pivotally mounted on a base and arranged to permit different circumferential portions of the associated bearing member to tilt radially with respect to the other member.

19. A thrust bearing having relatively rotatable bearing members in contact with each other, one of said members comprising a plurality of bearing shoes, and flexible mounting means, having relatively narrow annular supporting means, for said shoes so arranged as to permit them to tilt in radial planes.

20. A thrust bearing comprising a bearing member having an annular thrust surface, a coöperating bearing member comprising a plurality of tiltable bearing segments, and means for distributing the pressure over the several segments, the said means comprising a flexible sub-divided ring which occupies a relatively small space in an axial direction.

21. In a bearing, a longitudinally flexible equalizing structure composed of overlapping members mounted to tilt circumferentially of the bearing.

22. A thrust bearing comprising a bearing member having an annular thrust surface, a coöperating bearing member comprising a plurality of shoes, and means for distributing the pressure over the several shoes, the said means comprising a plurality of circumferentially conjoined sections adapted to tilt relatively to each other.

23. An equalizing structure for bearings comprising an annular channel, a plurality of equalizing plates tiltably mounted in the channel and held against rotation therein, and bridging plates mounted on the equalizing plates and adapted to support bearing shoes.

24. In a bearing, the combination of a plurality of bearing members and a ring support, transversely flexible as a unit, on which said bearing members are mounted, said ring support permitting radial tilting of said bearing members by reason of said transverse flexibility of said ring.

25. A bearing comprising a thrust collar, coöperating bearing means comprising a plurality of relatively movable members, a supporting pivot block for each of said movable members, and a plurality of tiltably mounted equalizers, each of said supporting pivot blocks being mounted upon and bridging the space between a pair of said equalizers.

26. A thrust bearing comprising relatively rotatable coöperating annular bearing means, one of said means being adapted to flex radially, and a pivotally-mounted ring shaped flexible equalizer for supporting said flexible bearing means so as to permit the radial flexure thereof.

27. A thrust bearing comprising relatively rotating annular bearing members in contact with one another and receiving the end thrust of the shaft one from the other, one of said bearing members comprising a flexible mounting ring which occupies a relatively small space in an axial direction, and annularly arranged pivotal supporting means therefor associated with said latter bearing member and permitting local tilting thereof in radial planes.

28. A thrust bearing comprising a bearing member rotating with the shaft, a stationary bearing member receiving the end thrust of the shaft on said rotating member, one of said bearing members comprising a plurality of annularly arranged bearing segments, means flexibly mounting said segments, and annually arranged supporting means therefor associated with said latter bearing member and permitting said segments to tilt in radial planes to accommodate irregularity of the bearing members.

29. A thrust bearing comprising a bearing member rotating with the shaft, a stationary annular bearing member receiving the end thrust of the shaft on said rotating member and itself comprising a plurality of bearing segments and a radially flexible ring supporting the same, and relatively narrow annular supporting means for said annular bearing member so arranged as to permit said segments to tilt in radial planes.

30. A thrust bearing comprising a bearing member rotating with the shaft, a stationary annular bearing member receiving the end thrust of the shaft on said rotating member and itself comprising a flexible ring and a plurality of bearing segments mounted on said ring, and annularly arranged supporting means for said annular bearing member permitting said segments to tilt in radial planes.

31. A bearing comprising a base, a series of members pivotally mounted thereon, a second of members bridging the ends of the first series, the two series constituting a substantially continuous flexible equalizing member, and bearing members mounted on said equalizing member.

32. A bearing comprising a base, a series of members pivotally mounted thereon, a second series of members bridging the ends of the first series, the two series constituting a substantially continuous flexible equalizing member, and a bearing member mounted on each of said bridging members.

33. In a bearing the combination of bearing members, and an equalizing structure for said bearing members comprising a plurality of circumferentially tiltable members and a plurality of members bridging the space between adjacent tiltable members and tiltable therewith.

34. A bearing comprising a base, an equalizing structure composed of members tiltably mounted on said base and members bridging the space between adjacent tiltable members and tiltable therewith, and bearing members mounted on said bridging members to tilt circumferentially.

35. A bearing comprising a base, an equalizing structure composed of members tiltably mounted on said base and members bridging the space between adjacent tiltable members and tiltable therewith, and bearing members mounted on said bridging members to tilt both circumferentially and radially.

36. In a bearing the combination of bearing members, and an equalizing structure for said bearing members comprising a plurality of circumferentially tiltable members and a plurality of members bridging the space between adjacent tiltable members and tiltable therewith, said bearing members being tiltably mounted on said equalizing structure.

37. In a bearing, a plurality of tiltable bearing segments and a plurality of tiltably-mounted equalizing members on which said bearing segments are tiltably mounted.

38. A thrust bearing comprising a bearing member rotating with the shaft, a stationary bearing member receiving the end thrust of the shaft on said rotating member, one of said bearing members comprising a plurality of bearing segments, a radially flexible ring on which said bearing segments are mounted, and relatively-narrow annularly arranged supporting means intermediate the width of said ring for permitting said bearing segments to tilt locally in radial planes.

39. In a bearing, the combination of a base, a series of bearing segments, and a longitudinally flexible equalizing structure interrelated tiltable members interposed between said base and bearing segments.

40. In a bearing, a longitudinally flexible equalizing structure composed of overlapping members mounted to tilt circumferentially of the bearing, and bearing members tiltably mounted on said equalizing structure.

41. In a bearing, a longitudinally flexible equalizing structure composed of overlapping members mounted to tilt circumferentially of the bearing, and bearing members mounted on said equalizing structure to tilt both radially and circumferentially of the bearing.

42. In a bearing, a longitudinally flexible equalizing structure composed of inter-related tiltably-conjoined members.

43. In a bearing, a base, a plurality of equalizing members mounted to rock on said base, and bearing segments supported from adjacent ends of each pair of said equalizing members.

44. In a bearing, a base, a plurality of rocking members mounted on said base, members bridging the spaces between said rocking members, and bearing segments mounted on said bridging members.

45. In a bearing, in combination with a base and a plurality of bearing segments, a flexible ring intermediate said base and bearing segments, means intermediate said ring and segments whereby said segments are mounted to tilt, and means intermediate said base and ring whereby the sections of said ring are mounted to flex with respect to each other.

46. In a bearing, the combination with a base and a plurality of bearing segments, of a flexible ring intermediate said base and bearing segments, the said ring being composed of a plurality of relatively-tiltable interrelated sections.

47. In a bearing, the combination with a base and a plurality of bearing segments, of a flexible ring intermediate said base and bearing segments, the said ring being composed of a plurality of interrelated sections, and means mounting said ring whereby said sections may tilt with respect to each other.

48. In a bearing, the combination with a base and a plurality of bearing segments, of a flexible ring intermediate said base and bearing segments, the said ring being composed of a plurality of interrelated sections, means intermediate said ring and segments whereby said segments may tilt with respect to each other, and means mounting said ring whereby said sections may tilt with respect to each other.

49. In a bearing, the combination of a base, a series of bearing segments, and a substantially continuous flexible equalizing structure of interrelated and conjoined members interposed between said base and the bearing segments and adapted to yield circumferentially with respect thereto.

50. In a bearing, the combination of a base, a plurality of equalizing members tiltably mounted on said base, a plurality of bearing segments, and means for tiltably supporting said bearing segments from adjacent ends of each pair of the said equalizing members.

51. In a bearing, the combination of relatively rotatable bearing members comprising a plurality of bearing segments and a pivotally-mounted flexible equalizing structure for equitably distributing the bearing pressure on said segments.

52. In a bearing, the combination of relatively rotatable bearing members comprising a plurality of bearing segments, and a pivotally-mounted flexible equalizing structure for equitably distributing the bearing pressure on said segments, the said segments being mounted on said equalizing structure to tilt both radially and circumferentially of the axis of the bearing.

In witness whereof, I have hereunto set my hand this 16th day of February, 1916.

ALBERT KINGSBURY.

Witness:
EMMA LEA MONTGOMERY.